United States Patent [19]
Breinlinger et al.

[11] Patent Number: 5,799,566
[45] Date of Patent: Sep. 1, 1998

[54] SELF-PROPELLED MOVING-FILTER BEVERAGE MAKER

[75] Inventors: Keith J. Breinlinger, Cambridge; Basak Ertan, Boston; Philip Houdek, II; Chin Yee Ng, both of Cambridge; Scott Roza; Yoddhojit Sanyal, both of Somerville; Craig Shull, Cambridge, all of Mass.

[73] Assignee: Massachusetts Institute of Technology

[21] Appl. No.: 796,291

[22] Filed: Feb. 7, 1997

[51] Int. Cl.$^6$ .................................................. A47J 31/00
[52] U.S. Cl. .................................. 99/320; 99/295; 99/296
[58] Field of Search ........................... 99/295, 296, 298, 99/319, 320, 318

[56] References Cited

U.S. PATENT DOCUMENTS

| | | | |
|---|---|---|---|
| 3,181,951 | 5/1965 | Gronvold | 99/320 X |
| 4,327,632 | 5/1982 | Batty et al. | 99/320 |
| 5,063,837 | 11/1991 | Precht | 99/295 |
| 5,063,838 | 11/1991 | Matuschek . | |
| 5,233,914 | 8/1993 | English | 99/282 |
| 5,287,796 | 2/1994 | Timm | 99/282 |
| 5,287,797 | 2/1994 | Grykiewicz et al. | 99/295 |
| 5,309,821 | 5/1994 | Knepler | 99/282 |
| 5,309,823 | 5/1994 | Allen | 99/295 |
| 5,337,652 | 8/1994 | Fischer et al. | 99/282 |
| 5,440,972 | 8/1995 | English | 99/282 |

*Primary Examiner*—Reginald L. Alexander
*Attorney, Agent, or Firm*—Iandiorio & Teska

[57] ABSTRACT

A self propelled moving-filter beverage maker includes an invertible housing having an elongate chamber, a cover at one end removably sealingly engaged with the housing for enabling the introduction and removal of liquid, and a separate non-neutral density filter free to move longitudinally in the chamber; the filter has a cross-section conforming to that of the chamber to minimize liquid bypass and has perforations at its longitudinal ends to accommodate liquid flow through the filter as the filter moves through the liquid each time the housing is inverted.

7 Claims, 2 Drawing Sheets

SELF-PROPELLED MOVING-FILTER BEVERAGE MAKER

FIELD OF INVENTION

This invention relates to a self-propelled moving-filter beverage maker for making a beverage from a beverage base and a liquid medium, and more particularly to such a beverage maker which uses gravity or buoyancy to move the beverage base through the liquid medium.

BACKGROUND OF INVENTION

Beverage makers especially those for brewing tea and coffee are of increasing interest due to the resurgence of consumer interest in quality, flavorful tea and more especially coffee. However, this desire is counter balanced by the need to make tea or coffee, quickly and easily to meet the time demands of busy people living fast paced lives with little time to make a pot of coffee. One problem is the need to brew but one cup at a time: more than that tends to over cook, lose flavor and even become bitter while being kept heated for later consumption. Another problem is the need to brew the coffee on the run or in places other than a home or kitchen where electrical power may not be available. Yet another problem is the need for two devices: one for brewing and one for consuming the coffee. Still another problem is the need periodically to purge coffee brewing pots or utensils in order to remove deposits that "sour" the coffee. An additional problem is the requirement of some such devices that a particular replaceable filter or coffee bag be used in the coffee brewer which necessitates that a supply of such filters or "coffee bags" be kept on hand at considerable expense. Often once a coffee brewer is activated there is no provision for monitoring the strength of the coffee being made and then arresting brewing when the proper strength has been reached.

SUMMARY OF INVENTION

It is therefore an object of this invention to provide a new and improved beverage maker.

It is a further object of this invention to provide such a new and improved beverage maker which can make one or more cups of coffee or other beverage quickly and simply.

It is a further object of this invention to provide a new and improved beverage maker which can make coffee or another beverage anywhere even without an energy source for heating the liquid medium.

It is a further object of this invention to provide a new and improved beverage maker with a standard beverage base, such as ground coffee beans or tea leaves supplied in common loose form or in prepackaged portions.

It is a further object of this invention to provide a new and improved beverage maker which serves as both a coffee brewer and a coffee cup or mug.

It is a further object of this invention to provide a new and improved beverage maker which is easy to clean and keep clean.

It is a further object of this invention to provide a new and improved beverage maker whose brewing action can be easily and quickly stopped at any point during the brewing process.

This invention results from the realization that a truly simple and effective beverage maker which also serves as the cup or mug for consumption of the brewed beverage can be achieved with an invertible housing having an elongate chamber with a cover at one end removably, sealingly engaged with the housing for enabling introduction of the liquid medium and the beverage base and a separate filter having non-neutral density or a specific gravity or density greater than or less than but not equal to that of the liquid medium so that the filter, when it contains the beverage base, is self-propelled through the liquid either by the force of gravity or the force of buoyancy to enable the filter to move through the liquid medium creating a flow of the liquid medium through the beverage base. Unlike traditional coffeemakers, the beverage base (coffee grounds) is being passed through a stationary body of liquid instead of vice versa.

This invention features a self propelled moving-filter beverage maker including an invertible housing with an elongate chamber. A cover at one end removably sealingly engages with the housing for enabling introduction and removal of liquid. There is a separate non-neutral density filter free to move longitudinally in the chamber, that is, the filter is either less dense or more dense than the liquid when the beverage base is contained in the chamber. For example, for a coffee or tea maker the filter loaded with the coffee or tea would have a specific gravity greater than or less than but not equal to one. The filter has a cross-section conforming closely to that of the chamber to minimize liquid bypass and there are perforations in the longitudinal ends of the filter to accommodate liquid flow through the filter as the filter moves through the liquid each time the housing is inverted.

In a preferred embodiment the chamber and the filter may be circular in cross-section. The filter may have a positive buoyancy or a negative buoyancy. The housing may include a heating device for heating the liquid in the housing. The filter may include a disposable porous package containing a beverage base or the filter may have a movable section for loading a beverage base.

DISCLOSURE OF PREFERRED EMBODIMENT

Other objects, features and advantages will occur to those skilled in the art from the following description of a preferred embodiment and the accompanying drawings, in which.

Figure 1:
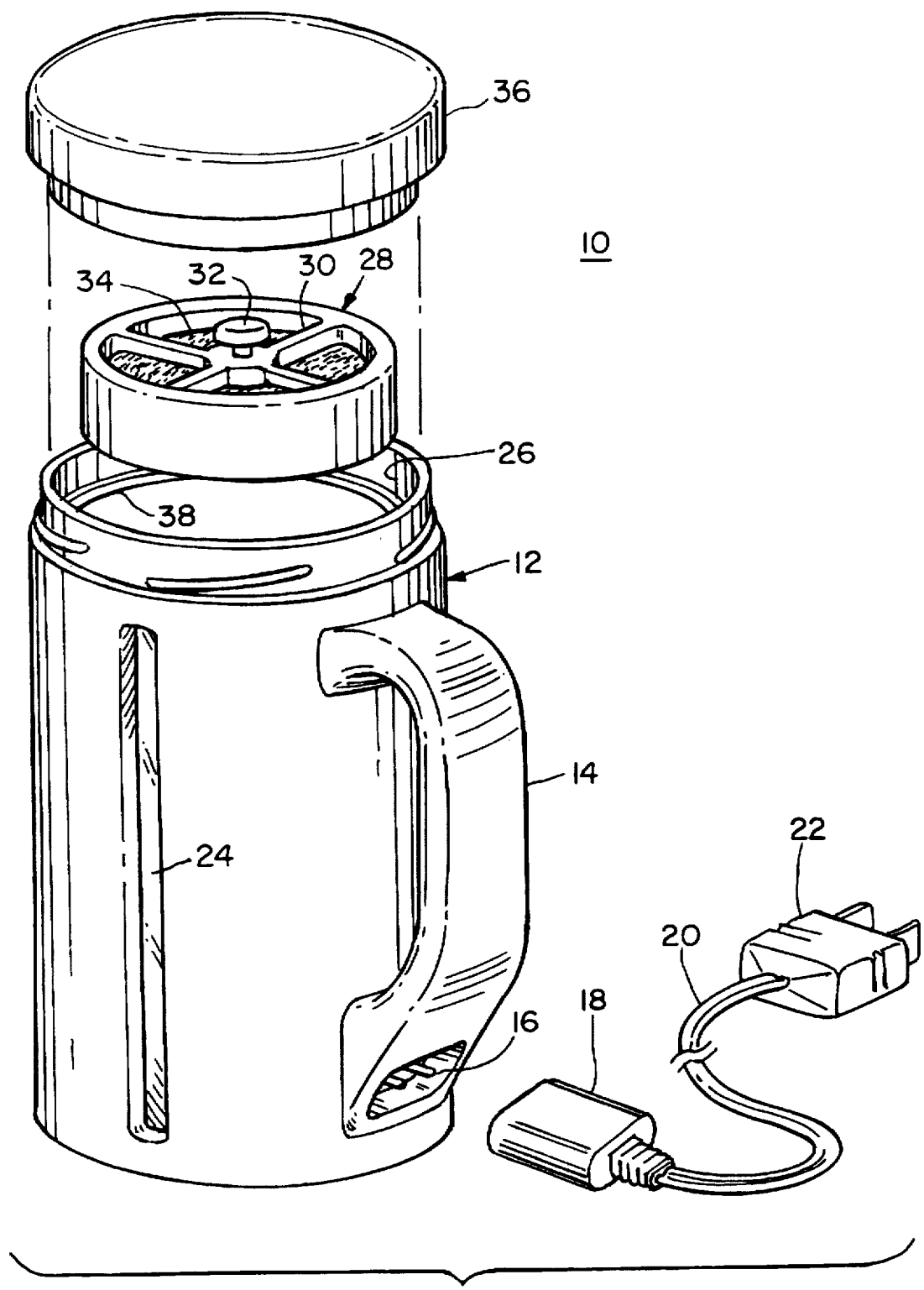
FIG. 1 is an exploded three-dimensional view of a self propelled moving-filter beverage maker according to this invention.

There is shown in FIG. 1 a coffee maker 10 according to this invention having the form of a typical travel coffee mug including a cup portion 12 and a handle 14. An electrical plug 16 at the bottom of handle 12 may be provided to receive a socket 18 on cable 20 that terminates in a conventional plug 22 for insertion into a conventional wall socket to energize the heater which is contained in cup 12. A transparent slot or window, or otherwise completely transparent housing 24 is provided so that the color of the liquid inside can be viewed to monitor the brewing process. Cup 12 is generally cylindrical as is its inner wall 26 which accommodates generally cylindrical filter 28. Filter 28 has a spider structure or frame 30 with a handle or knob 32 on top by which filter 28 can be lifted out of or placed in cylindrical chamber 26. Below frame 30 is a perforate or foraminous or porous membrane or member 34. It makes no difference exactly what the structure of part 34 is so long as whatever liquid medium is used to make the beverage can pass freely through it but the beverage base such as ground coffee beans or tea leaves cannot. Cover 36 when in place sealingly engages with lip 38 so that even when cup 12 is inverted no leakage of the liquid occurs.

Figure 2:
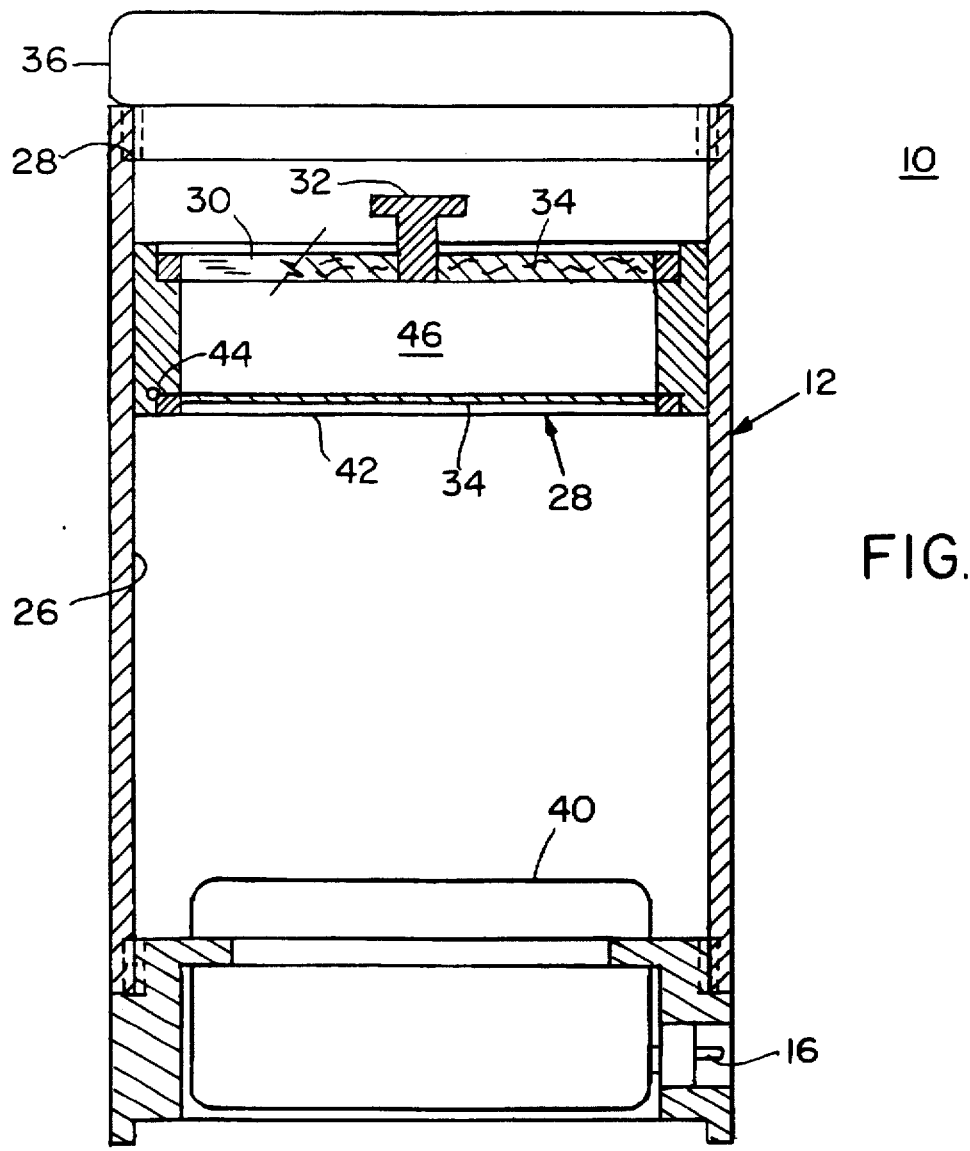
FIG. 2 is a side elevational cross-sectional view of the beverage maker of FIG. 1.

Plug 16, FIG. 1, is interconnected by internal wiring to heater 40, FIG. 2 which may be a conventional heater such as an immersion type heater. Although a heater is shown in this preferred embodiment, in many cases it may not be desirable since hot water or another liquid medium may be poured into cup 12 initially so that no heating is needed. Filter body 28 may include a section 42, FIG. 2, which is easily removable or even swingably attached by means of hinge 44 to the body of filter 28 for quick and easy loading of coffee or tea bags or bulk coffee or tea for example into the chamber 46 of filter 28. Section 42 has membrane or section 34 will be made porous, foraminous, perforate or in some manner able to pass the water or other liquid being used in the brewing operation. Cup 12 is filled with water or other liquid medium; if the beverage is to be a heated one, the water can be preheated or heated by means of heater 40. The beverage base is placed in chamber 46 and then filter 28 is placed inside of cup 12 and cover 36 is sealingly engaged with lip 38.

With filter 28 made of a material which is sufficiently less dense than water, (even after adding the beverage base and filter, the entire assembly still floats) the process starts with filter 28 floating atop the liquid in approximately the position as shown in FIG. 2. The beverage maker 10 is then inverted so that container 18 moves from its present position up toward the heater which is now on top. When it reaches that position, the cup can be inverted again and the process will repeat itself. By viewing through window 24, in FIG. 1, one can judge by the color when the beverage has reached the proper strength, typically two to six flips. Then cover 36 can be removed along with filter 28 and the beverage can be consumed hot, fresh and directly from beverage maker 10 itself.

Typically the materials out of which filter body 28 are made can be a low density plastic so the filter body 28 will have the proper positive buoyancy when loaded with coffee or tea and will constantly ascend toward the top of the liquid each time the cup 12 is inverted. The positive buoyancy is most convenient since the filter body 28 will come to rest at the top where it is most easily removed. But it may as well be made to have a negative buoyancy so that it drops to the bottom each time the cup is inverted. For this purpose, filter body 28 may be made of a higher density plastic or metal.

Filter body 28 has a cross section which closely approximates that of the inner wall 26 of cup 12 so that as filter body 28 moves along wall 26 freely yet it does not become cocked or wedged but moves readily smoothly over the length of the cup. In addition, by closely approximating the size of the filter 28 to wall 26 of cup 12, the water is forced to move through filter 28 and the beverage base loaded in chamber 46 rather than around it where it does not contribute to the brewing process. This makes for quicker and more efficient brewing process. Typically, for example, with cup 12 having a circular cross-section of 3" in diameter filter 28 would have a circular cross-section allowing an annular clearance on the order of a few thousandths of an inch or more.

Figure 3:
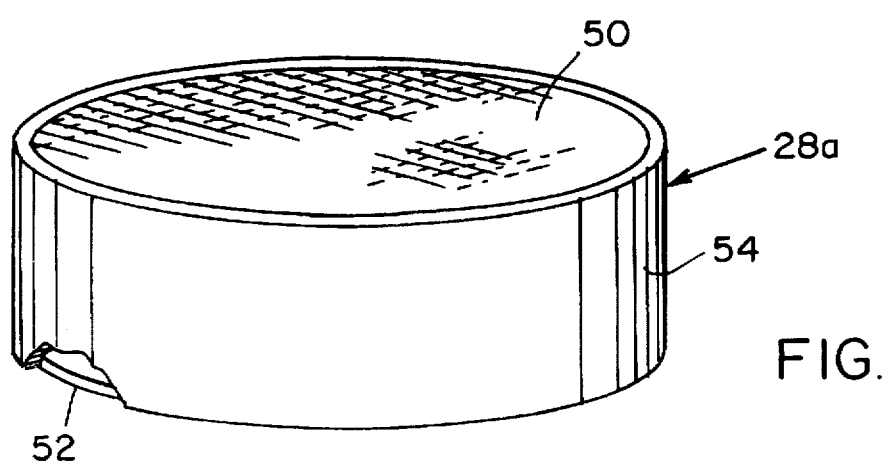
FIG. 3 is a three-dimensional view of a container formed from a prepared porous package already containing the beverage base.

Although thus far filter 28 is shown having a permanent reusable housing which can contain bagged or loose coffee or tea, this is not a necessary limitation of the invention. For example, filter 28a, FIG. 3, may be a preformed, disposable package which contains upper 50 and lower 52 porous or foraminous or perforate material which contains the beverage base in it. Filter 28a would also closely conform in shape and size to that of the interior wall 26 of cup 12; even the cylindrical side wall 54 of filter 28a may be perforate or foraminous. The material out of which the top and bottom sections 50 and 52 are made should be such that filter 28a, when loaded with the beverage base, exhibits either a positive buoyancy or a negative buoyancy depending upon whether the desire is to have the filter sink down through the liquid or ascend upwards through the liquid.

Although specific features of this invention are shown in some drawings and not others, this is for convenience only as each feature may be combined with any or all of the other features in accordance with the invention.

Other embodiments will occur to those skilled in the art and are within the following claims:

What is claimed is:

1. A self propelled moving-filter beverage maker comprising:

an invertible housing having an elongate chamber;

a cover at one end removably sealingly engaged with said housing for enabling introduction and removal of liquid;

a separate non-neutral bouyancy filter free to move longitudinally in said chamber, said filter having a cross-section conforming to that of said chamber to minimize liquid bypass and having perforations in its longitudinal ends to accommodate liquid flow through said filter as said filter moves through the liquid each time said housing is inverted.

2. The moving filter beverage maker of claim 1 in which said chamber and said filter are circular in cross-section.

3. The moving filter beverage maker of claim 1 in which said filter has positive buoyancy.

4. The moving filter beverage maker of claim 1 in which said filter has negative buoyancy.

5. The moving filter beverage maker of claim 1 in which said housing includes a heating device for heating the liquid in the housing.

6. The moving filter beverage maker of claim 1 in which said filter includes a disposable porous package containing a beverage base.

7. The moving filter beverage maker of claim 1 in which said filter has means for loading a beverage base.

* * * * *